US012634843B2

(12) United States Patent
  Thorsén et al.

(10) Patent No.: US 12,634,843 B2
(45) Date of Patent: May 19, 2026

(54) LIMITING INTERFERENCE IN A WIRELESS POINT-TO-POINT OR POINT-TO-MULTIPOINT NETWORK

(71) Applicant: Telefonaktiebolaget LM Ericsson (publ), Stockholm (SE)

(72) Inventors: Per-Arne Thorsén, Öjersjö (SE); Naga Vishnu Kanth Irukulapati, Västra Frölunda (SE); Mikael Coldrey, Borås (SE); Magnus Nilsson, Kungsbacka (SE); Rahul Devassy, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 342 days.

(21) Appl. No.: 18/570,796

(22) PCT Filed: Jun. 17, 2021

(86) PCT No.: PCT/SE2021/050595
  § 371 (c)(1),
  (2) Date: Dec. 15, 2023

(87) PCT Pub. No.: WO2022/265544
  PCT Pub. Date: Dec. 22, 2022

(65) Prior Publication Data
  US 2024/0314707 A1     Sep. 19, 2024

(51) Int. Cl.
  *H04W 52/36*     (2009.01)
  *H04W 52/24*     (2009.01)
(52) U.S. Cl.
  CPC ....... *H04W 52/367* (2013.01); *H04W 52/241* (2013.01)
(58) Field of Classification Search
  CPC ........................... H04W 52/367; H04W 52/241
  (Continued)

(56) References Cited

U.S. PATENT DOCUMENTS 6,694,148 B1 * 2/2004 Frodigh .................... H04L 5/06
                                                  370/347
7,046,966 B2 * 5/2006 Davis .................... H04L 1/0002
                                                  455/69

(Continued)

FOREIGN PATENT DOCUMENTS

CN          1716806 B        3/2012
WO     2003/049320 A1      6/2003

(Continued)

OTHER PUBLICATIONS

Wang, "Power-Sensitive Fair Scheduling in Multiple Antenna Systems", VTC-2005-Fall. 2005 IEEE 62nd Vehicular Technology Conference, 2005, Sep. 25, 2005, pp. 2575-2579, XP010878919.

(Continued)

*Primary Examiner* — April G Gonzales
(74) *Attorney, Agent, or Firm* — Rothwell, Figg, Ernst & Manbeck, P.C.

(57)          ABSTRACT

A transmitting node (16) in a wireless point-to-point or point-to-multipoint network comprises a radio circuit (38) set to transmit data to at least one corresponding receiving node (18) on a corresponding radio link (RL1) as well as a control unit (50) that obtains, from a corresponding receiving node (18), a momentaneous link quality measure, obtains a momentaneous requested transmission rate Rreq, determines a momentaneous power requirement Preq based on the momentaneous link quality measure SNIR and the momentaneous requested transmission rate Rreq, and controls the radio circuit (38) to limit interference through: investigating if a momentaneous output power P of the transmitting node satisfies the momentaneous power requirement Preq, controlling the radio circuit (38) to transmit data to the receiving node (18) using the momentaneous output power P in case it does and adjusting the output (Continued)

power P towards the momentaneous power requirement Preq in case it does not.

19 Claims, 6 Drawing Sheets

(58) Field of Classification Search
USPC ........................................................ 455/522
See application file for complete search history.

(56) References Cited

U.S. PATENT DOCUMENTS

| | | | | | |
|---|---|---|---|---|---|
| 7,587,217 | B1 * | 9/2009 | Laakso | ................. | H04W 52/50 |
| | | | | | 370/318 |
| 9,002,391 | B1 * | 4/2015 | Goyal | ................. | H04W 52/365 |
| | | | | | 455/512 |
| 9,113,430 | B2 * | 8/2015 | Osterling | ............. | H04W 52/52 |
| 9,282,523 | B2 * | 3/2016 | Yu | ........................ | H04W 52/367 |
| 10,116,367 | B1 * | 10/2018 | Sakoda | ................... | H04B 7/061 |
| 2002/0123349 | A1 * | 9/2002 | Miyoshi | ............. | H04W 52/267 |
| | | | | | 455/562.1 |
| 2003/0022630 | A1 * | 1/2003 | Gandhi | ............... | H04W 52/367 |
| | | | | | 455/69 |
| 2004/0198405 | A1 * | 10/2004 | Marinier | ............. | H04W 52/343 |
| | | | | | 455/522 |
| 2005/0113028 | A1 * | 5/2005 | Uchida | ................. | H04W 48/16 |
| | | | | | 455/67.11 |
| 2005/0286419 | A1 * | 12/2005 | Joshi | ..................... | H04W 40/28 |
| | | | | | 370/278 |
| 2007/0248067 | A1 * | 10/2007 | Banerjea | ................. | H04L 45/26 |
| | | | | | 370/338 |
| 2008/0170550 | A1 * | 7/2008 | Liu | ........................ | H04L 49/602 |
| | | | | | 370/338 |
| 2010/0172249 | A1 * | 7/2010 | Liu | ........................ | H04L 45/124 |
| | | | | | 370/252 |
| 2010/0195535 | A1 * | 8/2010 | Ziller | .................... | H04W 40/28 |
| | | | | | 370/254 |
| 2011/0159914 | A1 * | 6/2011 | Chen | ................... | H04W 52/362 |
| | | | | | 455/522 |
| 2011/0170443 | A1 * | 7/2011 | Murias | .................. | H04W 40/28 |
| | | | | | 370/252 |
| 2011/0249612 | A1 * | 10/2011 | Kubo | .................... | H04W 40/12 |
| | | | | | 370/315 |
| 2012/0113915 | A1 * | 5/2012 | Chen | ................... | H04W 52/365 |
| | | | | | 370/328 |
| 2015/0124720 | A1 * | 5/2015 | Morimoto | ............. | H04L 5/0073 |
| | | | | | 370/329 |
| 2015/0141068 | A1 * | 5/2015 | Immonen | .............. | H04L 5/0098 |
| | | | | | 455/522 |
| 2015/0244430 | A1 * | 8/2015 | Shattil | ................. | H04L 41/0816 |
| | | | | | 370/254 |
| 2020/0059771 | A1 * | 2/2020 | Zhang | ................. | H04L 67/1042 |
| 2020/0196219 | A1 * | 6/2020 | Hashemi | ............... | H04W 40/28 |
| 2020/0204975 | A1 * | 6/2020 | Abouelseoud | .... | H04W 72/0446 |
| 2020/0221367 | A1 * | 7/2020 | Hashemi | .............. | H04W 40/12 |
| 2020/0229067 | A1 * | 7/2020 | Hashemi | .............. | H04B 7/0617 |
| 2024/0314707 | A1 * | 9/2024 | Thorsén | ............. | H04W 52/241 |
| 2025/0211290 | A1 * | 6/2025 | Czegledi | ............. | H04B 7/0413 |
| 2025/0305834 | A1 * | 10/2025 | Ouyang | .............. | G06V 10/806 |

FOREIGN PATENT DOCUMENTS

| | | |
|---|---|---|
| WO | 2005/020520 A2 | 3/2005 |
| WO | 2012/089252 A1 | 7/2012 |
| WO | 2013/127699 A1 | 9/2013 |

OTHER PUBLICATIONS

Ding et al., "MIMO-NOMA Design for Small Packet Transmission in the Internet of Things", IEEE Access, vol. 4, Apr. 5, 2016, pp. 1393-1405, XP01160797.

Fu et al., "Energy Conservation and Interference Mitigation: From Decoupling Property to Win-Win Strategy", IEEE Transactions on Wireless Communications, vol. 10, No. 11, Nov. 2011, pp. 3943-3955, XP011389703.

International Search Report and Written Opinion issued in International Application No. PCT/SE2021/050595 Feb. 21, 2022 (12 pages).

* cited by examiner

114 — Collect dynamic operating conditions

116 — Obtain static network characteristics

120 — Optimize and update model

118 — Estimate Interference

122 — Maximize f$_W$ wrt Pmax

124 — Update network nodes with new Pmax

62

126

80

128

LIMITING INTERFERENCE IN A WIRELESS POINT-TO-POINT OR POINT-TO-MULTIPOINT NETWORK

CROSS REFERENCE TO RELATED APPLICATIONS

This application is a 35 U.S.C. § 371 National Stage of International Patent Application No. PCT/SE2021/050595, filed 2021 Jun. 17.

TECHNICAL FIELD

The invention generally relates to the limiting of interference in a wireless point-to-point or point-to-multipoint network. More particularly, the invention relates to a transmitting node in a wireless point-to-point or point-to-multipoint network, a method, computer program and computer program product for reducing interference in a transmitting node of a wireless point-to-point or point-to-multipoint network as well as to such a wireless point-to-point or point-to-multipoint network.

BACKGROUND

One important aspect of communication in a wireless point-to-point or point-to-multipoint network is the saving of energy using power control of a transmitting node. One way to do this is known from WO 2012/089252.

Another important aspect is the limiting of interference on the radio links or signal paths. This is in wireless point-to-point or point-to-multipoint networks typically handled through planning based on a worst-case signal degradation caused by interference. Typically rules of thumb are used, e.g. total power from interferers is specified in terms of typical receiver noise and the associated threshold degradation. The worst-case condition assumed is in most cases maximum possible interference power related to minimum signal power, where the assumption is that fading takes place in the signal path but not in the interfering paths and the influence of interference is decided by antenna, polarization and frequency discrimination only. Other rules of thumb can also take a feature like Automatic Transmit Power Control (ATPC) into account, e.g. by assuming an "X dB output power discount" for interferers output power.

There is reason to believe that the above-mentioned planning approach overestimates the impact of interference. This constrains the reuse of frequencies and polarizations. It also puts unnecessary tight requirements on antenna discrimination. All this drives cost, both regarding equipment and licenses for frequency usage.

There is therefore a need for another approach of limiting interference in a wireless point-to-point or point-to-multipoint network.

SUMMARY

One object of the invention is thus to improve interference limitation in a wireless point-to-point or point-to-multipoint network.

This object is according to a first aspect achieved by a transmitting node in a wireless point-to-point or point-to-multipoint network, where the transmitting node comprises a radio circuit set to transmit data to at least one corresponding receiving node on a corresponding radio link. The transmitting node comprises a processor that acts on computer instructions implementing a control unit, where the control unit is configured to:

obtain, from a corresponding receiving node, a momentaneous link quality measure, obtain a momentaneous requested transmission rate, determine a momentaneous power requirement based on the momentaneous link quality measure and the momentaneous requested transmission rate, and control the radio circuit to limit interference.

The control of the radio circuit to limit interference comprises: investigating if a momentaneous output power of the transmitting node satisfies the momentaneous power requirement, controlling the radio circuit to transmit data to the receiving node using the momentaneous output power in case the momentaneous output power of the transmitting node satisfies the momentaneous power requirement, and adjusting the output power towards the momentaneous power requirement in case the momentaneous output power of the transmitting node does not satisfy the momentaneous power requirement.

The object is through a second aspect achieved by a computer program for reducing interference in a transmitting node of a wireless point-to-point or point-to-multipoint network, where the transmitting node comprises a radio circuit set to transmit data to at least one corresponding receiving node on a corresponding radio link. The computer program comprises computer program code which when run by a processor of the transmitting node, implements a control unit that is configured to:

obtain, from a corresponding receiving node, a momentaneous link quality measure, obtain a momentaneous requested transmission rate, determine a momentaneous power requirement based on the momentaneous link quality measure and the momentaneous requested transmission rate, and control the radio circuit to limit interference.

In this case the control of the radio circuit to limit interference comprises investigating if a momentaneous output power of the transmitting node satisfies the momentaneous power requirement, controlling the radio circuit to transmit data to the receiving node using the momentaneous output power in case the momentaneous output power of the transmitting node satisfies the momentaneous power requirement, and adjusting the momentaneous output power towards the momentaneous power requirement in case the momentaneous output power of the transmitting node does not satisfy the momentaneous power requirement.

The object is according to a third aspect achieved by a computer program product for reducing interference in a transmitting node of a wireless point-to-point or point-to-multipoint network, which computer program product comprises a data carrier with the computer program code according to the second aspect.

The object is according to a fourth aspect achieved through a method of reducing interference in a first transmitting node of a wireless point-to-point or point-to-multipoint network, where the first transmitting node comprises a radio circuit set to transmit data to at least one corresponding receiving node on a corresponding radio link. The method comprises, in the first transmitting node:

obtaining, from the corresponding receiving node, a momentaneous link quality measure, obtaining a momentaneous requested transmission rate, determining a momentaneous power requirement based on the momentaneous link quality measure and the momentaneous requested transmission rate, and controlling the radio circuit to limit interference.

The controlling of the radio circuit to limit interference in turn comprises: investigating if a momentaneous output power of the transmitting node satisfies the momentaneous power requirement, controlling the radio circuit to transmit data to the receiving node using the momentaneous output power if the momentaneous output power of the transmitting node satisfies the momentaneous power requirement, and adjusting the output power towards the momentaneous power requirement in case the momentaneous output power of the transmitting node does not satisfy the momentaneous power requirement.

The object is according to a fifth aspect achieved through a wireless point-to-point or point-to multipoint network comprising a number of transmitting and receiving nodes, each transmitting node comprising a radio circuit set to transmit data to at least one corresponding receiving node on a corresponding radio link, where at least some of the transmitting nodes each comprise a processor acting on computer instructions implementing a control unit, where the control unit is operative to:

obtain, from a corresponding receiving node, a momentaneous link quality measure, obtain a momentaneous requested transmission rate, determine a momentaneous power requirement based on the momentaneous link quality measure and the momentaneous requested transmission rate, and control the radio circuit to limit interference.

The control of the radio circuit to limit interference comprises: investigating if a momentaneous output power of the transmitting node satisfies the momentaneous power requirement, controlling the radio circuit to transmit data to the receiving node using the momentaneous output power if the momentaneous output power of the transmitting node satisfies the momentaneous power requirement, and adjusting the output power towards the momentaneous power requirement in case the momentaneous output power of the transmitting node does not satisfy the momentaneous power requirement.

The wireless network may be a transport network or a backhaul network, such as a backhaul network of a mobile communication system. The wireless network may additionally be a microwave network, i.e. a network operating in the microwave frequency range.

The receiving and transmitting nodes may additionally be stationary.

The momentaneous link quality measure of a radio link may be at least partly indicative of interference on the radio link.

The radio link may employ radio resources, such as frequency resources and/or time resources, like time slots of a time division duplex structure.

The power requirement may be the power needed for maintaining the link quality at the receiving node as defined in the link quality measure for the requested transmission rate.

According to a first variation of the first and fifth aspects, the control unit is operative to control the radio circuit to increase the output power if the momentaneous output power is lower than the momentaneous power requirement and to control the radio circuit to decrease the output power if the momentaneous output power is higher than the momentaneous power requirement.

According to a corresponding variation of the fourth aspect, the adjusting comprises increasing the output power if the momentaneous output power is lower than the momentaneous power requirement and decreasing the output power if the momentaneous output power is higher than the momentaneous power requirement.

According to a second variation of the first and fifth aspects, the control unit is operative to control the radio circuit to keep the output power above a minimum output power level.

According to a corresponding variation of the fourth aspect, the controlling of the radio circuit comprises controlling the radio circuit to keep the output power above a minimum output power level.

The minimum output power level may be fixed. Alternatively, the minimum output power level may be variable.

According to a third variation of the first and fifth aspects, the control unit is operative to control the radio circuit to keep the output power below a maximum output power level.

According to a corresponding variation of the fourth aspect, the controlling of the radio circuit comprises controlling the radio circuit to keep the output power below a maximum output power level.

The maximum output power level may be fixed. Alternatively, the maximum output power level may be variable.

In the case of a variable maximum output level, it may be set based on a quality of service associated with the momentaneous requested transmission rate.

In this case the control unit may investigate the quality of service associated with the momentaneous requested transmission rate and select a maximum output power level corresponding to the quality of service.

In a similar manner the method may comprise investigating the quality of service associated with the momentaneous requested transmission rate and selecting a maximum output power level corresponding to the quality of service.

The variable maximum output power level may additionally be set based on observed dynamic operating conditions of at least some links, and with advantage all links, in the wireless network. The observed dynamic operating conditions may comprise conditions such as radio link fading, actual link quality and actual output power of the nodes.

The variable maximum output power level may be an output power of the transmitting node that together with output powers of other transmitting nodes in the wireless network optimises network performance.

The network performance may be defined by a function of individual link performance parameters, where a link performance parameter may be a link performance parameter in the group of link quality, link transmission rate and link transmission power.

The network performance may be optimised when the function is maximized with regard to output power during current signal transmission conditions.

The function may additionally be a scalar function, such as a linear, non-linear, and even time varying function.

One example of a function is a sum or a weighted sum of the link performance parameter comprising 1. squared difference between served rate and demanded rate 2. squared difference between served link quality and required link quality 3. a weighted sum of (2) and the link transmit power

4. zero if the served link quality is above required link quality and (2) otherwise, where link quality may be signal to noise and interference ratio.

The signal transmission conditions may comprise estimated interferences on each of the at least some links, which estimated interferences have been estimated based on the observed dynamic conditions.

The estimated interferences may have been obtained through the application of machine learning on the observed dynamic operating conditions of each of the at least some links and the static network characteristics.

The estimated interferences may additionally or instead have been obtained based on an application of the observed dynamic operating conditions of each of the at least some links and static network characteristics in a model of the wireless network.

The model may be a model that is based on a relationship between output power of the transmitting nodes and fading on radio links and interfering paths as well as based on a relationship between link quality as detected by the receiving nodes and fading on radio links and interfering paths. The relationships may additionally include relationships between output power and noise as well as between link quality and noise. It is additionally possible that interference is represented by one or more parameters of the model, such as by one or more fading parameters.

In order to provide a variable maximum output power that is set based on dynamic observed operating conditions, the wireless network may comprise a power limit determination unit comprising a processor acting on computer instructions whereby the power limit determination unit is operative to determine the variable maximum output power for at least some transmitting nodes corresponding to the previously-mentioned at least some radio links and with advantage for all transmitting nodes of the wireless network, which links are links on which the at least some transmitting nodes transmit data.

According to a variation of the fourth aspect, the method therefore comprises, in a central power limit determination unit, collecting dynamic observed operating conditions of the at least some links in the wireless network, obtaining static network characteristics, estimating the interference of the at least some links based on the dynamic observed operating conditions and static network characteristics, determining, based on the estimated interferences, a combination of individual output powers of transmitting nodes that optimises network performance and supplying the individual output powers to the transmitting nodes, which supplying comprises supplying the first transmitting node with the individual output power that it contributes to the optimizing of network performance as the maximum output power level.

According to a corresponding variation of the fifth aspect, the power limit determination unit is operative to collect the dynamic observed operating conditions of said at least some links in the wireless network, obtain static network characteristics, estimate the interference of said at least some links based on the dynamic observed operating conditions and the static network characteristics, determine, based on the estimated interferences, a combination of individual output powers of said at least some transmitting nodes that maximizes network performance and supply the individual output powers to said at least some transmitting nodes as the variable maximum output power levels.

According to a further variation of the fourth aspect, the optimizing of network performance comprises maximizing the function with regard to output power during current signal transmission conditions.

According to a corresponding variation of the fifth aspect the power limit determination unit is operative to, when optimizing network performance, maximize the function with regard to output power during current signal transmission conditions.

According to yet another variation of the fourth aspect, estimating the interference on each of the at least some links based on the dynamic observed operating conditions and static network characteristics comprises applying the dynamic observed operating conditions and static network characteristics in a model of the wireless network, where interference is represented by one or more parameters of the model.

In a corresponding variation of the fifth aspect, the power limit determination unit, when being operative to estimate the interference on each of the at least some links based on the dynamic observed operating conditions and static network characteristics, is operative to apply the dynamic observed operating conditions and static network characteristics in a model of the wireless network, where interference is represented by one or more parameters of the model.

The determining of a combination of individual output powers of the at least some transmitting nodes that optimizes network performance may involve applying the network link parameters of the maximized function and the current signal transmission conditions, including the estimated inferences, in the model and obtaining the individual output powers as a result.

The radio links of the transmitting nodes comprise radio resources, where the radio resources that are available or can be used by the links are defined by link-related planning factors.

For at least some transmitting nodes in the wireless network and with advantage all the transmitting nodes, the only link-related planning factors used are link-related planning factors taken from the group consisting of hop length, carrier frequency, fixed link attenuation due to free space loss, atmospheric absorption, rain and other wave propagation phenomena, receiver and transmitter antenna gain, detector noise, receiver noise and receiver detector performance and transmitter performance.

Thereby the link-related planning factor interference is not used.

The power limit determination unit may additionally be provided in a power limit determination node of the wireless network.

The invention according to the above-mentioned aspects has a number of advantages. It provides interference limitation without unnecessarily limiting the available radio resources.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Aspects of the present disclosure are directed towards limiting interference in wireless point-to-point or point-to-multipoint networks, which wireless networks may with advantage be wireless microwave networks, i.e. networks operating in the microwave frequency range.

Such wireless networks can be used in a variety of environments, where one environment is the mobile communication environment, where a wireless point-to-point network is employed as a backhaul network. However, the wireless network may also be used as a transport network in other types of environments.

Figure 1:
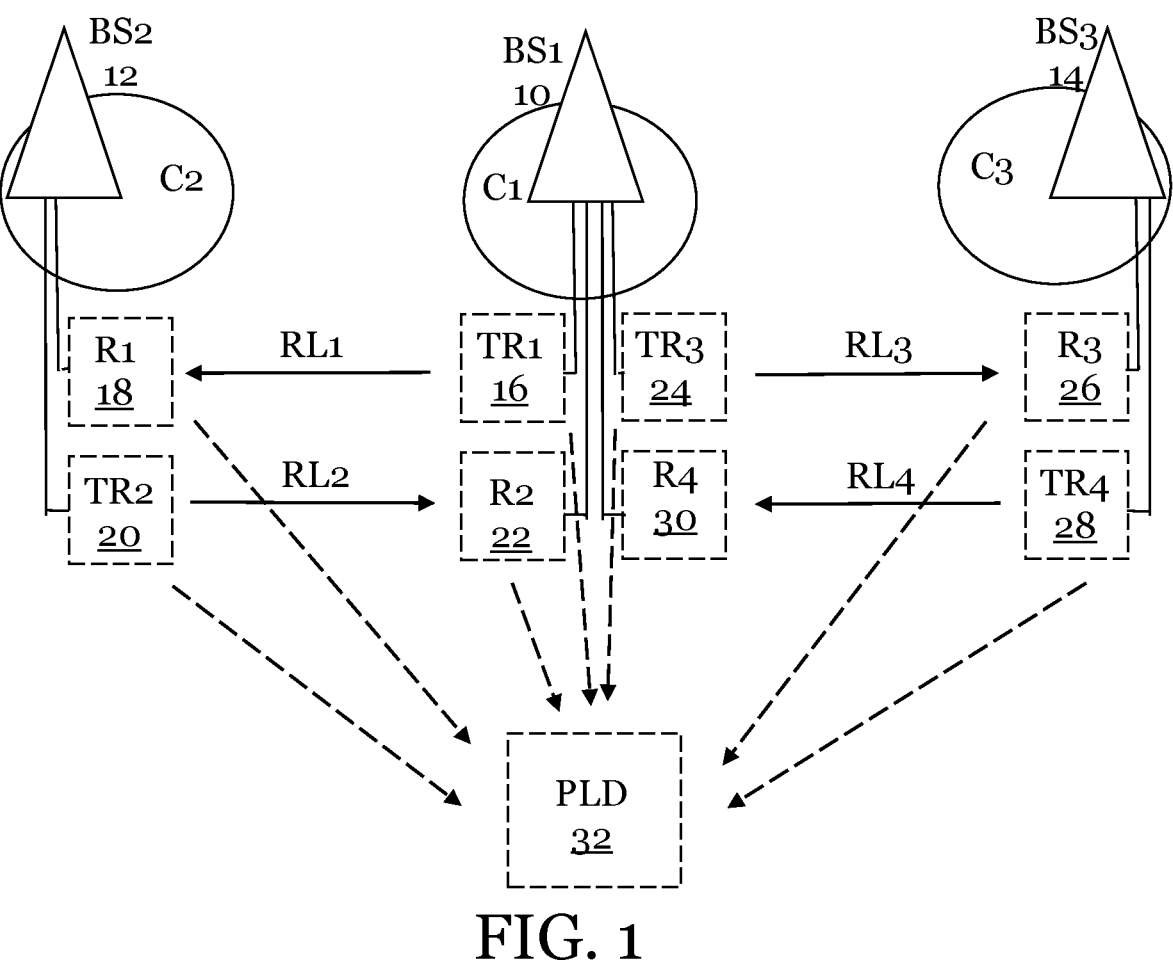
FIG. 1 schematically shows three base stations of a mobile communication system, which base stations are interconnected via transmitting and receiving nodes of a backhaul network, FIG. 2 schematically shows three node pairs of a wireless point-to-point network used to implement the backbone network of the mobile communication system, FIG. 3 schematically shows relevant parts of a first transmitting node and a first receiving node of a transmitter and receiver node pair communicating with each other, FIG. 4 schematically shows a first realization of a control unit of the first transmitting node, FIG. 5 schematically shows a second realization of the control unit, FIG. 6 schematically shows a first realization of a power limit determination unit provided in the wireless point-to-point network.

FIG. 1 schematically shows one such example, where three base stations BS1 10, BS2 12 and BS3 14, often termed eNodeB or gNodeB, are provided in an access network of a mobile communication system. Each base station provides a cell for mobile communication with user equipment (UE). The first base station 10 thereby provides a first cell C1, the second base station 12 provides a second cell C2 and the third base station 14 provides a third cell C3.

There is also a first transmitter receiver node pair comprising a first transmitting node TR1 16 and a first receiving node R1 18 communicating via a first radio link RL1, a second transmitter receiver node pair comprising a second transmitting node TR2 20 and a second receiving node R2 22 communicating via a second radio link RL2, a third transmitter receiver node pair comprising a third transmitting node TR3 24 and a third receiving node R3 26 communicating via a third radio link RL3 as well as a fourth transmitter receiver node pair comprising a fourth transmitting node TR4 28 and a fourth receiving node R4 30 communicating via a fourth radio link RL4. The first transmitting node 16, the second receiving node 22, the third transmitting node 24 and the fourth receiving node 30 are connected to the first base station 10, the first receiving node 18 and the second transmitting node 20 are connected to the second base station 12 and the third receiving node 26 and the fourth transmitting node 28 are connected to the third base station 14. The first transmitting node 16 and the second receiving node 22 may form a first station, the first receiving node 18 and the second transmitting node 20 may form a second station, the third transmitting node 24 and the fourth receiving node 30 may form a third station and the third receiving node 26 and fourth transmitting node 28 may form a fourth station.

The transmitting and receiving nodes are nodes in a wireless point-to-point network, which in this case is a backhaul network of the mobile communication system and with advantage operates in the microwave frequency range. Furthermore, the nodes are stationary nodes.

There is also a power limit determination unit PLD 32 that collects data from the transmitting and receiving nodes.

Furthermore, the mobile communication system can be any type of mobile communication, such as a third (3G) fourth (4G) or fifth generation (5G) mobile communication system.

Figure 2:
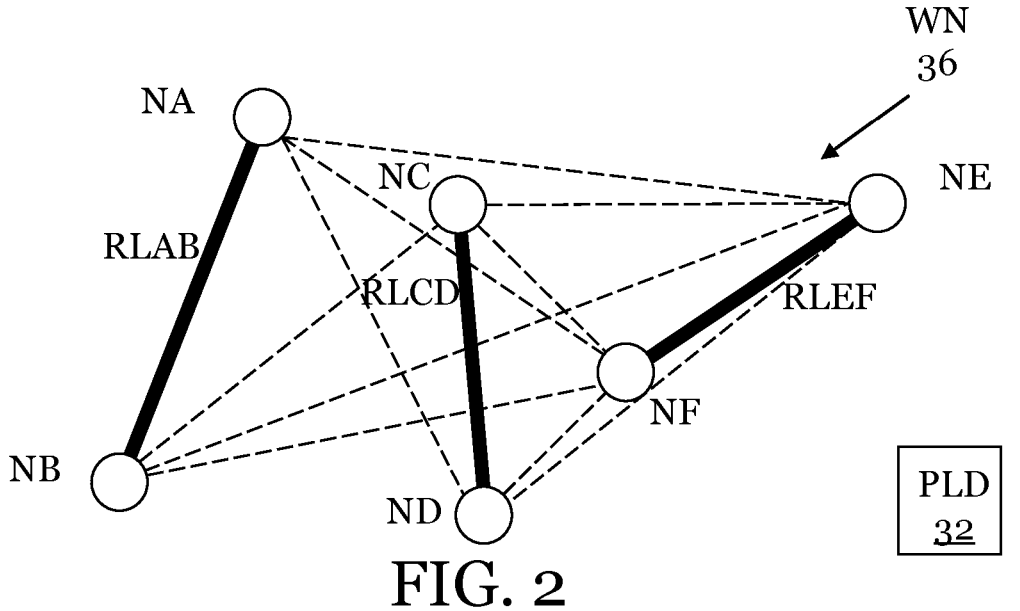

FIG. 2 schematically shows six stations in a wireless point-to-point network WN 36, where each station comprises a transmitting node of a transmitter and receiver node pair as well as a receiving node of another transmitter and receiver node pair, which pairs share the same radio link. There is therefore a first station NA communication with a second station NB via a corresponding radio link RLAB, a third station NC communicating with a fourth station ND via a corresponding radio link RLCD and a fifth station NE communicating with a sixth station NF via a corresponding radio link RLEF. The radio links RLAB, RLCD and RLEF are shown with thick solid lines. It should be realized that it is possible that a station only comprises a receiving node or a transmitting node.

In the network 36, the stations also experience interference. As an example, the first station NA experiences interference from the fourth station ND, the fifth station NE and the sixth station NF. The second station NB experiences interference from the third station NC, the fifth station NE and the sixth station NF. The third station NC experiences interference from the second station NB, the fifth station NE and the sixth station NF. The fourth station ND experiences interference from the first station NA, the fifth station NE and the sixth station NF. The fifth station NE experiences interference from the first station NA, the second station NB, the third station NC and the fourth station ND. Finally, the sixth station NF experiences interference from the first station NA, the second station NB, the third station NC and the fourth station ND. Interference is reciprocal. A station experiencing interference also interferes the station from which it receives this interference. Interference paths with caused and experienced interference are indicated with dashed lines in the figure.

Also, the power limit determination unit PLD 32 is provided in the wireless network 36. The role of the power limit determination unit 32 will be described later.

Figure 3:
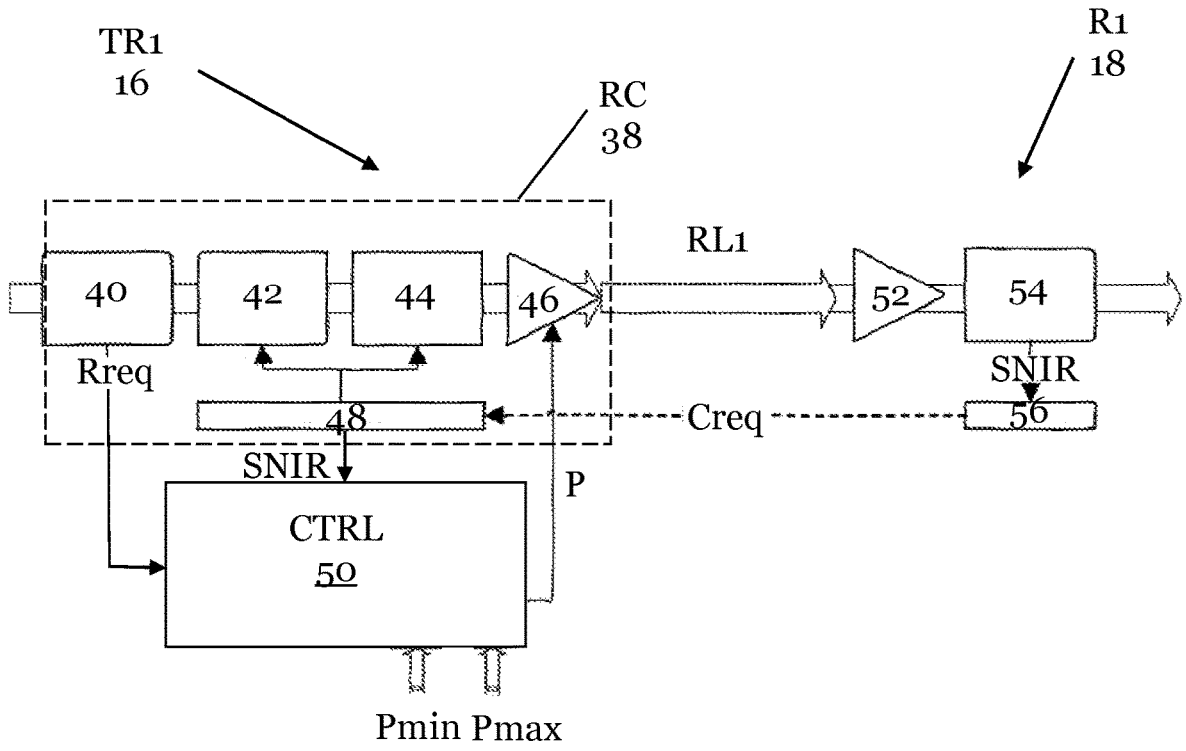

FIG. 3 schematically shows relevant details of the first transmitting node 16 and the first receiving node 18 of the first transmitter and receiver node pair.

The first transmitting node 16 comprises a radio circuit RC 38 comprising a traffic interface 40 on which it receives data to be transmitted to the first receiving node 18. The traffic interface 40 is connected to a channel coder 42, which in turn is connected to a modulator 44. The modulator 44 is in turn connected to an amplifier 46, such as a power amplifier, which amplifier 46 transmits the data to the receiving node 18 over the first radio link RL1. The data is transmitted using radio resources, such as frequency resources, and/or time resources, like time slots of a time division duplex structure. The receiving node 18 in turn comprises an amplifier 52, such as a low noise amplifier (LNA) connected to a demodulator 54. In the receiving node 18 there is also a first coding controller 56 that communicates with a second coding controller 48 in the radio circuit 38 of the transmitting node 16. The first coding controller 56 obtains a link quality measure, here in the form of Signal to Noise plus Interference Ratio (SNIR), from the demodulator 54 and supplies the link quality measure in a control request Creq to the second coding controller 48, which in turn controls the code rate of the channel coder 42 and the modulation of the modulator 44 based on the link quality measure.

The channel coder 44 may be a low-density parity-check (LDCP) channel coder, the modulator 44 may be a quadrature amplitude modulation (QAM) modulator, the demodulator 54 may be a QAM demodulator and the first and second controllers 56 and 48 may be adaptive coding and modulation (ACM) controllers, where the control request Creq is an ACM request. It should here be realized that these are mere examples of channel coders, modulators, demodulators and controllers and that other types of coding, modulation and control may be used.

In the transmitting node 16 there is also a control unit CTRL 50 that receives a requested transmission rate Rreq from the traffic interface 40, the link quality measure SNIR from the second controller 48 and controls the power amplifier 46 to use a certain output power P. The control unit 50 also uses a minimum output power level Pmin and a maximum output power level Pout, which levels may be provided internally or received from external sources such as the power limit determination unit 32.

Figure 4:
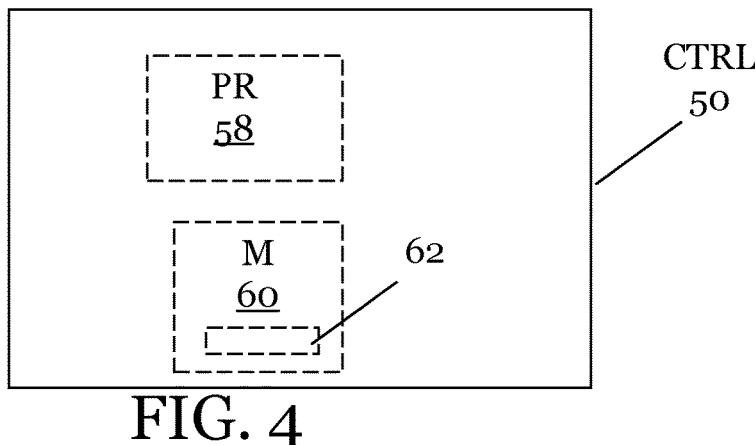

FIG. 4 schematically shows a first realization of the control unit 50 of the transmitting node. The control unit 50 may be provided in the form of a processor PR 58 connected to a program memory M 6o. The program memory 6o may comprise a number of computer instructions 62 implementing the functionality of the control unit 50.

Figure 5:
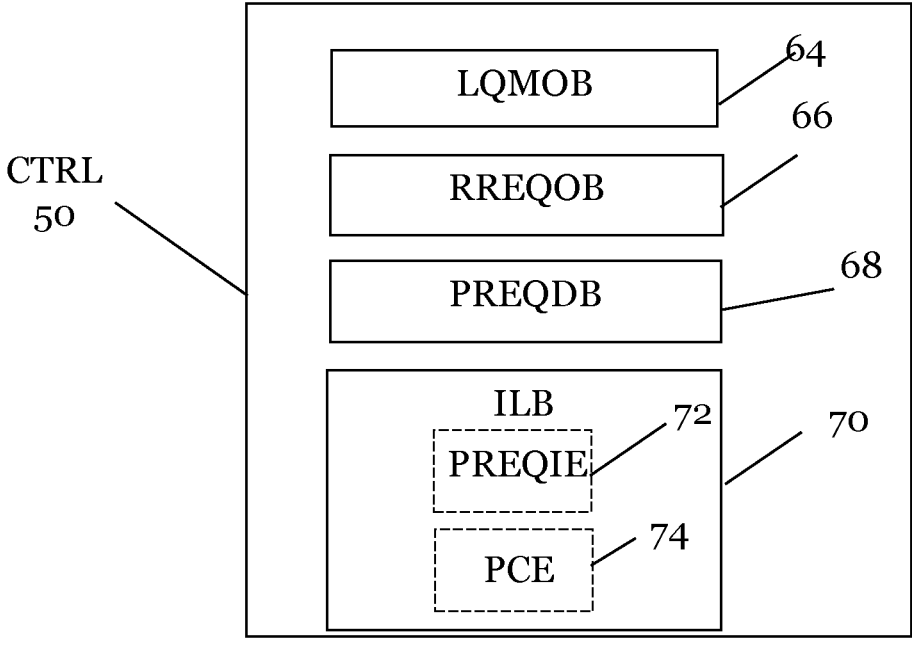

FIG. 5 shows a second realization of the control unit 50 comprising a number of blocks. It comprises a link quality measure obtaining block LQMOB 64, a requested transmission rate obtaining block RREQOB 66, a power requirement determining block PREQDB 68 and an interference limiting block ILB 70, where the interference limiting block 70 comprises a power requirement investigating element PREQIE 72 and a power control element PCE 74.

The blocks in FIG. 5 may be provided as software blocks, for instance as software blocks in a program memory, or as hardware blocks.

Figure 6:
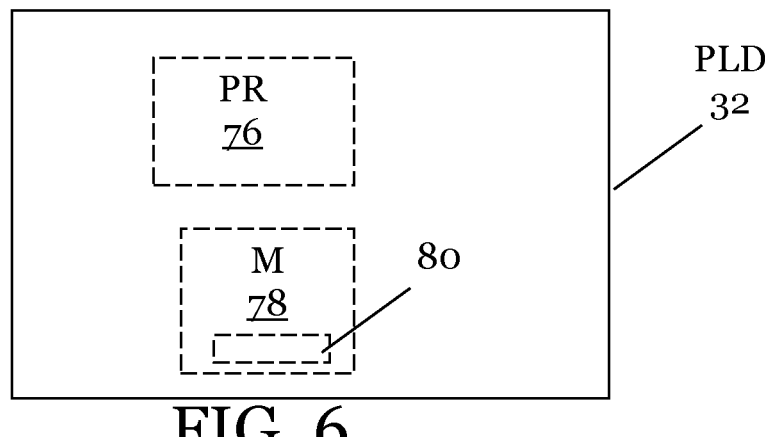

FIG. 6 schematically shows a first realization of the power limit determination unit 32. The power limit determination unit 32 may be provided in the form of a processor PR 76 connected to a program memory M 78. The program memory 78 may comprise a number of computer instructions 80 implementing the functionality of the power limit determination unit 32.

Figure 7:
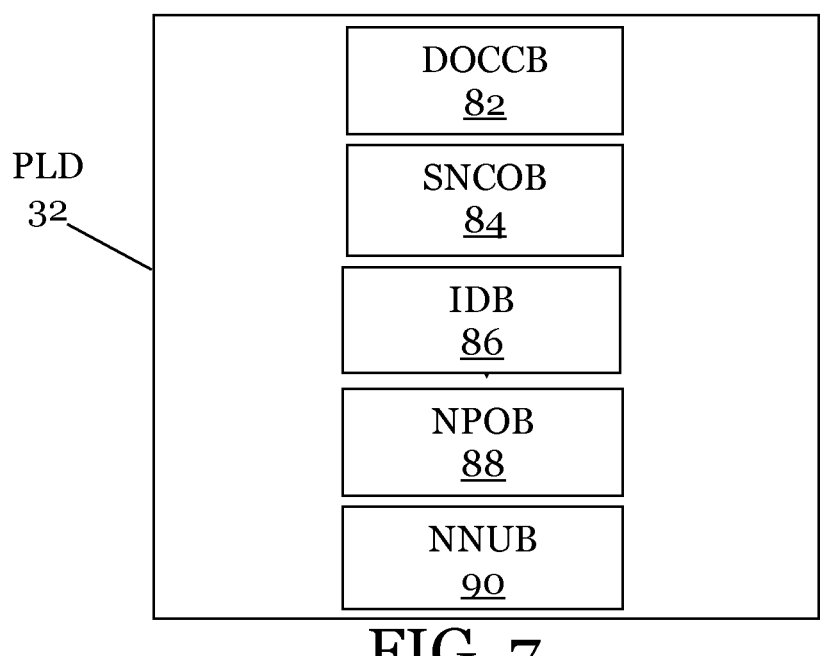
FIG. 7 shows a second realization of the power limit determination unit.

FIG. 7 shows a second realization of the power limit determination unit 32 in the form of a number of blocks. It comprises a dynamic operating conditions collecting block DOCCB 82, a static network characteristics obtaining block SNCOB 84, an interference determining block IDB 86, a network performance optimizing block NPOB 88 and a network node updating block NNUB 90.

The blocks in FIG. 7 may likewise be provided as software blocks, for instance in a program memory, or as hardware blocks.

As can be seen in FIG. 2, the nodes in the wireless network 36 experience interference from each other.

The normal way of considering inference in wireless point-to-point networks is through planning the system for a worst-case scenario where a worst-case condition assumed may be the maximum possible interference power related to minimum signal power. Typically rules of thumb are used, e.g. total power from interferers is specified in terms of typical receiver noise and the associated threshold degradation.

Thereby the network is not used as efficiently as it could be. Aspects of the present disclosure are directed towards increasing the efficiency of the network use especially with regard to handling interference.

The relation between SNIR and output power P in a network exposed to interference can be described with the following equations $$P = \left( diag^{-1}(SNIR) \cdot H_D - H_I \right)^{-1} \cdot N \qquad (1)$$

$$SNIR = diag^{-1}(H_I \cdot P + N) \cdot H_D \cdot P \qquad (2)$$

The equations (1) and (2) expresses the same relation between the vector quantities, with P or SNIR as the free variable.

$H_D$ and $H_I$ are real valued matrices describing signal and interference power relations between transmitters and receivers in the wireless network, where $H_D$ defines the signal power relations in the signal paths, i.e. in the radio links, and $H_I$ the interference power relations in the interfering paths. These matrices also comprise static and dynamic parts. The static parts are decided by e.g. antenna directionality, frequency and polarization discrimination and free space loss. The dynamic parts are due to fading phenomena in signal and interfering paths.

N is a vector quantity describing the noise in each receiver, basically decided by the receivers' noise factors.

If the network is not congested, i.e. a solution (bounded by P) for equation (1) above exists, then a power control in the transmitting node normally used for saving energy, for instance a power control according to WO 2012/089252, will find that solution iteratively using equation (6) as described below.

In the transmitting node 16 of FIG. 3, the second coding controller 48 of the radio circuit 38 calculates an ACM target corresponding to a capacity demand detected at the user data interface 40. There may be a one to one correspondence between this ACM target and SNIR required at the receiver 18. Thereby the locally derived ACM targets in the different transmitters constitute a SNIR target for the network necessary to reach the requested capacity.

Formulated as logarithmic quantities the iterative procedure may look in the following way:

$$SNIR_n = P_n + H_D - NI_n \quad (3)$$

$$\widehat{SNIR} = \hat{P} + H_D - \widehat{NI} \quad (4)$$

$$\widehat{SNIR} - SNIR_n = \hat{P} - P_n - (\widehat{NI} - NI_n) \quad (5)$$

$$\text{Assuming: } \hat{P} = P_{n-1} + (\widehat{NI} - NI_n) = P_{n-1} + \varepsilon_{n+1}$$

$$P_{n+1} = P_n + \widehat{SNIR} - SNIR_n \quad (6)$$

where NI denotes the combined effect of noise and interference and circumflex quantities represent values solving equation (1). Equation (6) indicates an iterative dead-beat control approach for solving equation (1). Note that this iteration occurs implicitly when each hop tries to reach its local SNIR target. If there is no interference in the network, the error e is always zero and the target is reached after one iteration. A necessary and sufficient condition for the iterations to converge is that equation (1) is solvable (and within the output power constraints of the network).

Equation (1) not being solvable can be interpreted as that the antenna discrimination (adjusted for the different propagation conditions) between (at least) two stations being less than the required SNIR of each station.

In case there is no solution to the P(SNIR) equation, then the following reasoning applies.

A scalar function $f_w$ of an individual link performance parameter such as SNIR can be used as a performance measure for the network. The task may then be to maximize the value of that function with relation to P during current conditions ($H_D$, $H_I$). The exact characteristics of $f_w$ is less important, it can be linear, non-linear, and even time varying and taking traffic demand for different traffic classes into account. The important thing is that it is credible as a performance measure for the network.

The thing now is to constrain the maximum output power of each transmitter in the network according to the vector P that maximizes $f_w$.

This means that if all transmitter/receiver pairs in the network individually negotiate the output power they use to meet capacity requirements; a congested network will converge (by saturation) to the optimum condition.

Note that the objective is to maximize the function $f_w$. That function could be formulated such that dynamically varying capacity demands per link and e.g. marginal benefits of improved SNIR are taken into account. I.e., the objective is maximizing network utility. But taking more of the dynamic network behaviour into account also requires more bandwidth to be used up, combined with tighter latency requirements, to communicate both the values of the observed data and the controlled parameters. In one extreme, all calculations are performed by the power limit determination unit, having access to all necessary data. In another extreme, maximum power is configured once for each node and applied during the lifetime of the network, i.e. the "power limit determination" would in that case only be a matter of configuration guidelines.

It is possible to observe actual N, P SNIR and the elements of $H_D$. Resolving the elements of $H_I$ is in the general case an underdetermined problem.

At least in the case of rain fading dominating, it should be possible to use a model/hypothesis-based method to estimate $H_I$ from $H_D$.

As can be seen above, the use of a power saving control scheme, for instance the scheme used in WO 2012/089252, in fact also limits interference. Thereby it is possible to use radio links, the dimensioning of which has been made without handling interference. The link related planning factors used to define the radio resources that are available for a radio link do thus not include planning factors that consider interference.

Figure 8:
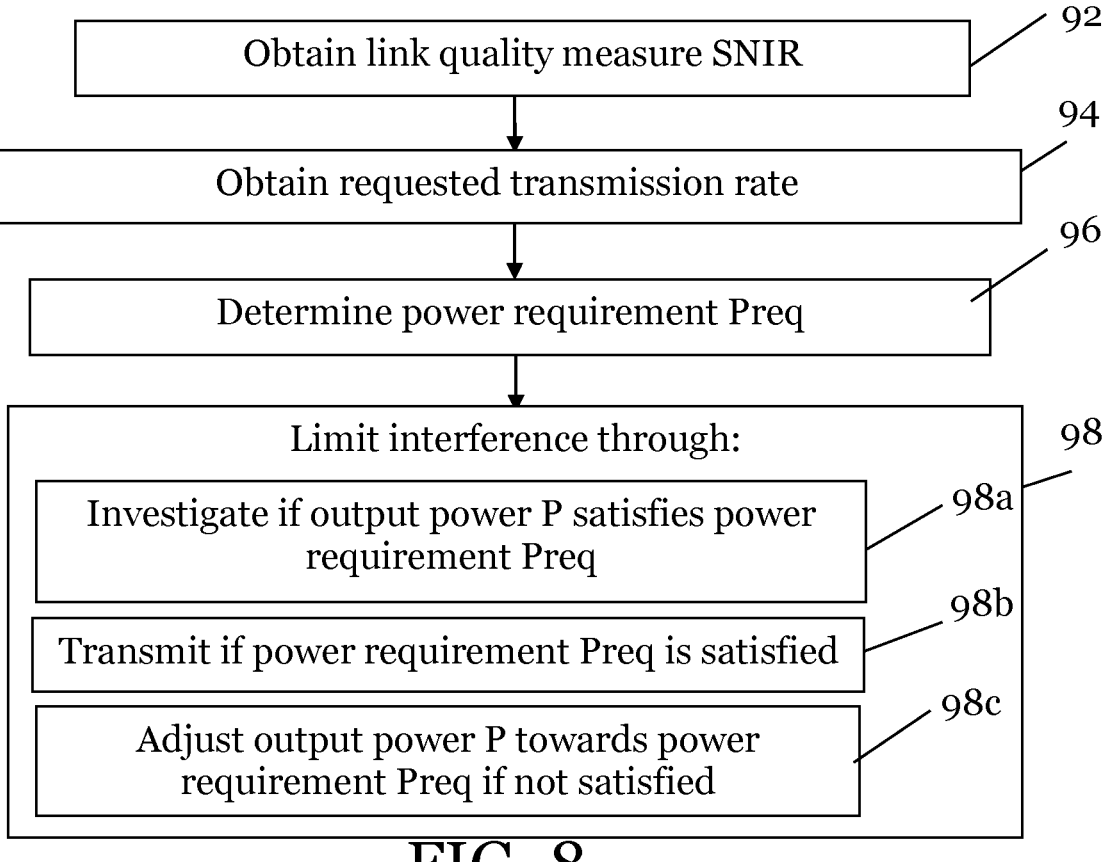
FIG. 8 shows a flow chart of a number of steps in a first embodiment of a method of reducing interference in a transmitting node and being performed in the first transmitting node.

How interference limitation may be performed in the first transmitting node 16 according to a first embodiment will now be described with reference also being made to FIG. 8, which shows a flow chart of a number of method steps in a method of limiting interference being performed in the first transmitting node 16.

The method, which may be continuously performed by the control unit 50 in the transmitting node 16, may then have the following operation:

The link quality measure obtaining block 64 of the control unit 50 may obtain, from the corresponding receiving node 18, a momentaneous link quality measure, step 92, where in the example of FIG. 3 the link quality measure obtaining block 64 of the control unit 50 receives the link quality measure from the second coding controller 48, which in turn may have received it from the first coding controller 56 in the receiving node 18 via the control request Creq. The link quality measure may as one example be signal to noise ratio (SNR) and as another example a signal to noise plus interference ratio (SNIR). However, it should be realized that also other measures are possible, such as bit error rate (BER). In the present examples SNIR is used, which is at least partly indicative of the interference on the first radio link RL1.

The requested transmission rate obtaining block 66 in turn obtains a momentaneous requested transmission rate Rreq, step 94, which is the transmission rate desired to be used on the first radio link RL1. The requested transmission rate Rreq may be received from the traffic interface 40.

The momentaneous requested transmission rate Rreq and the momentaneous link quality measure SNIR are then supplied to the power requirement determining block 68, which goes on and determines a momentaneous power requirement Preq based on the momentaneous link quality measure SNIR and the momentaneous requested transmission rate Rreq, step 96, where the power requirement Preq is the power needed for maintaining the link quality at the receiver as defined in the link quality measure for the requested transmission capacity.

The power requirement Preq is then supplied to the interference limiting block 70, which goes on and controls the radio circuit 38 to limit the interference, step 98, which involves the power requirement investigating element 72 investigating if a momentaneous output power P of the transmitting node 16 satisfies the momentaneous power requirement Preq, step 98a, where the momentaneous output power is the currently used output power of the amplifier 46. If the momentaneous output power satisfies the momentaneous power requirement Preq, the power control element 74 controls the radio circuit 38 to transmit data to the receiving node 18 using the momentaneous output power P, step 98b. However, in case the momentaneous output power does not satisfy the power requirement Preq, the power control element 74 adjusts the output power P towards the momentaneous power requirement Preq, step 98c, and then uses the adjusted power in the transmission of the data, where the use may be carried out through setting the power amplifier 46 to transmit with the adjusted power on the first radio link RL1. The adjusted power can be a power increase or a power decrease.

This type of control, which has in essence previously been used to save power, has surprisingly shown to be efficient for limiting interference and thereby there is no need to consider interference in the dimensioning of the first radio link RL1. Put differently, interference is no link-related planning factor used to define the radio resources that are available for the radio link RL1.

Thereby, the only link-related planning factors used for dimensioning the radio link are the link related planning factors taken from the group consisting of hop length, carrier frequency, fixed link attenuation due to free space loss, atmospheric absorption, rain and other wave propagation phenomena, receiver and transmitter antenna gain, detector noise, receiver noise and receiver performance and transmitter performance. The only link related planning factors used in the limiting of the radio resources that can be assigned to the first radio link RL1 are thereby link-related planning factors in the above-mentioned group.

One advantage of this approach is that the introduction of a way to mitigate interference events enables the possibility to apply a lower margin for interference when planning the wireless network, and even without such a margin. This in turn enables a better utilization of available radio resources and the possibility to save cost by less strict equipment requirements. For an operator this will enable an opportunity of building networks using fewer frequency channels, thus saving license costs.

By introducing traffic aware power control in the above described way it is possible to increase the radio resource efficiency to support a higher traffic load in the wireless network, which can be combined with a higher frequency/channel reuse, where radio resource efficiency is the use of available radio resources in a more efficient way. No bandwidth is wasted just to protect the wireless network from interference.

Thereby, it is possible to support more traffic thanks to higher frequency reuse (=wider bandwidth) without the need of acquiring more radio resources.

Another positive effect is that less power is consumed compared to when there is no traffic aware power control.

Another positive effect is that the radio resource bill can be reduced since it is possible to support more traffic with the same radio resources as in a legacy system or, equivalently, support the same traffic as the legacy system but with less radio resources.

One side effect of higher radio resource reuse is that interference is increased. However, the gain from higher radio resource reuse (=wider bandwidth) typically outperforms the negative effect of more interference since these kinds of systems already operate at high SNR. In case the interference is simply too high between some radio links then those links should not use too aggressive frequency reuse and instead use separate frequencies/channels.

Radio resource efficiency is thus increased, which enables the support of a higher traffic load and this is combined with a decreased power consumption.

Figure 9:
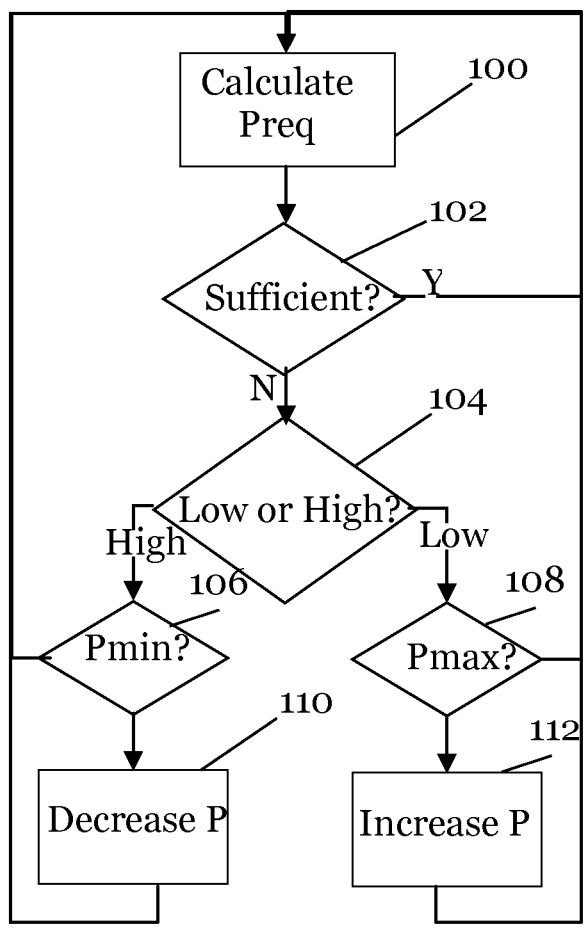
FIG. 9 shows a flow chart of a first number of method steps in a second embodiment of the method of reducing interference, which first number of method steps is performed in the first transmitting node.

Now a second embodiment will be described with reference also being made to FIG. 9, which shows a first number of method steps in a method of reducing interference, which first number of steps are being performed in the control unit 50 of the first transmitting node 16.

Also here the link quality measure obtaining block 64 of the control unit 50 obtains the momentaneous link quality measure SNIR and supplies it to the power requirement determining block 68. The requested transmission rate obtaining block 66 obtains the momentaneous requested transmission rate Rreq and supplies it to the power requirement determining block 68. The power requirement determining block 68 then goes on and calculates the momentaneous power requirement Preq based on the momentaneous link quality measure SNIR and the momentaneous requested transmission rate Rreq, step 100.

The momentaneous power requirement Preq is then supplied to the interference limiting block 70, where the power requirement investigating element 72 investigates if the momentaneous output power P of the transmitting node 14 is sufficient, step 102, and then the power control element 74 controls the radio circuit 38 to transmit data to the receiving node 18 using the momentaneous output power P if it is.

However, in case the momentaneous output power P is insufficient, step 102, the power requirement investigating element 72 investigates if the momentaneous output power is too low or too high compared with the power requirement Preq. In case the momentaneous output power is too high, step 104, the power requirement investigating element 72 investigates if the momentaneous output power is at a minimum power level Pmin. If the momentaneous output power is at the minimum power level Pmin, step 106, the momentaneous output power is continued to be used despite being too high. However, if the momentaneous output power is not at the minimum power level Pmin, step 106, the power requirement investigating element 72 informs the power control element 74 that the power should be decreased, which may be a decrease to the power level of the momentaneous output power requirement Preq or to the minimum level Pmin, whichever is highest. The power control element 74 then decreases the output power P of the amplifier 46 to the new power level, step 110. It thus controls the radio circuit 38 to decrease the output power if the momentaneous output power is higher than the momentaneous power requirement Preq. The power control element 74 may additionally control the radio circuit 38 to keep the output power above the minimum output power level Pmin.

However, if the momentaneous output power is too low, step 104, the power requirement investigating element 72 investigates if the momentaneous output power is at a maximum level Pmax. If the momentaneous output power is at the maximum power level Pmax, step 108, then the momentaneous output power is continued to be used despite being considered too low, while if the momentaneous output power is not at the maximum power level Pmax, step 1o8, the power requirement investigating element 72 informs the power control element 74 that the power P should be increased, which may be an increase to the power level of the momentaneous output power requirement Preq or to the maximum level Pmax, whichever is lowest. The power control element 74 then increases the output power of the amplifier 46 to the new power level, step 112. It thus controls the radio circuit 38 to increase the output power if the momentaneous output power is lower than the momentaneous power requirement Preq. The power control element 74 may additionally control the radio circuit 38 to keep the output power above a minimum output power level Pmax.

If more than one transmitting node in the wireless network operates in this way, it can be seen that they modify their momentary output power based on current radio propagation conditions and capacity requirement. This is controlled by the SNIR required by each corresponding peer receiver node, i.e. interference is included in radio propagation conditions.

It can also be seen that the power levels are not continued to be adjusted if being at a highest or lowest level. This is important because in some cases, transmitting nodes that interfere with each other may be in "a race condition" where they keep on raising the output power in order to avoid the interference caused by the other node. Through having maximum and minimum levels, this situation is avoided.

The maximum and possibly also the minimum level may be fixed and may as an example be based on a maximum allowed interference level. In case the maximum and minimum power levels are fixed, the second embodiment ends here.

However, in variations of the second embodiment, one or both of the minimum and maximum power levels may be variable.

Especially, the maximum level may be variable. It may additionally be set based on the dynamic operating conditions in the wireless network, such as radio signal path fading, actual SNIR and actual output power of the nodes. Data about dynamic operating conditions may include, but is not limited to, current output power settings, experienced interference and detected input radio signal level. It is additionally possible that the level is set based on traffic demand, possibly classified for different traffic quality of service classes. Such a setting of the level may be made by the control unit 50 itself based on the quality of service of the data that is to be transmitted. A quality of service may thereby be associated with the momentaneous requested transmission rate. The control unit may then investigate the quality of service associated with the momentaneous requested transmission rate and select a maximum output power level corresponding to this quality of service.

The variable maximum output power level may additionally be set based on observed dynamic operating conditions of at least some links, and with advantage all links, in the wireless network, where the observed dynamic operating conditions may comprise conditions such as radio link fading, actual link quality and actual output power of the nodes. The variable maximum output power of the first transmitting node may additionally be an output power that together with output powers of other transmitting nodes in the wireless network optimises network performance.

In order to enable the provision of a variable maximum output power level having been set in the above-described way, the maximum power level Pmax may with advantage be set by the power limit determination unit 32. It is additionally possible that such variable maximum levels are being set for several transmitting nodes. The power limit determination unit may thereby be a central power limit determination unit provided in a central power limit determination node of the wireless network that provides maximum output power levels for at least some of the transmitting nodes, and with advantage all of the transmitting nodes, of the wireless network.

Figure 10:
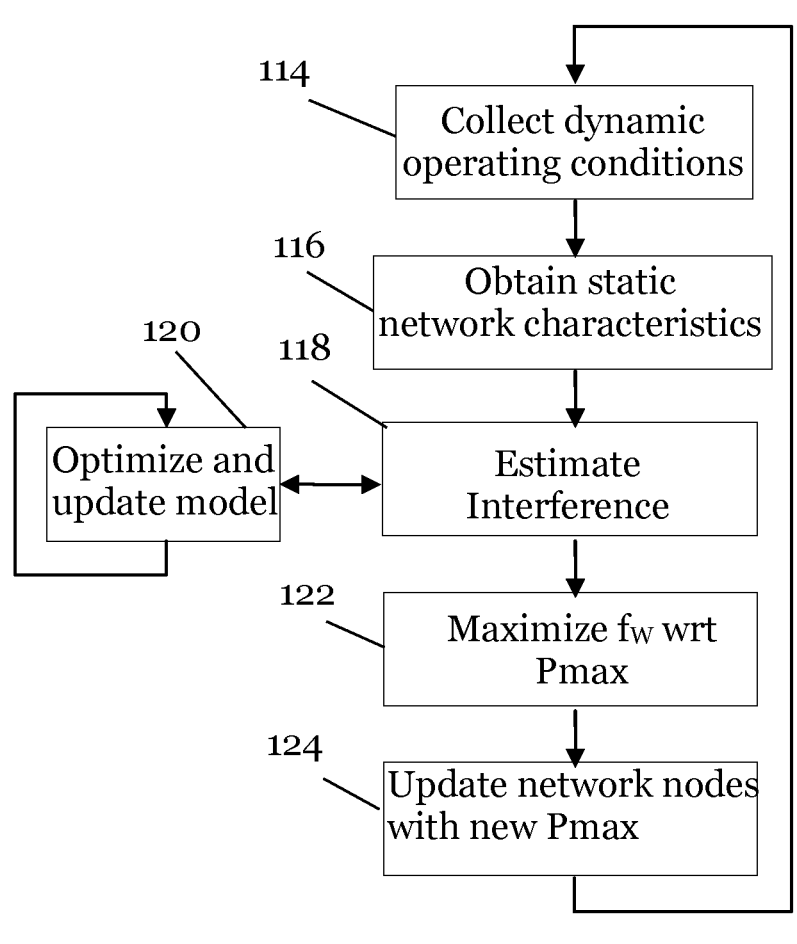
FIG. 10 shows a second number of method steps in the second embodiment of the method for reducing interference, which second number of method steps is performed by the power limit determination unit.

FIG. 10 shows a flow chart of a second number of method steps in the method of limiting interference according to the second embodiment, which second number of method steps are being performed in the power limit determination unit 32 in order to provide at least some nodes of the wireless network with variable maximum output power levels.

The power limit determination unit 32 determines the variable maximum power limit of at least some of the transmitting nodes of the wireless network. It more particularly determines the variable maximum output power levels of these nodes based on dynamic observed operating conditions of at least some links in the wireless network and with advantage based on all links in the wireless network. It is thus advantageous if the power limit determination unit 32 determines the variable maximum output power levels for all of the transmitting nodes based on the observed operating conditions of all the links.

The determination may more particularly involve the dynamic operating conditions collecting block 82 collecting dynamic observed operating conditions of the at least some links in the wireless network, step 114, and supplying these to the interference determining block 86.

The collected dynamic network data may comprise data on the transmitters output power, the receiver's signal strength, signal to noise ratio and experienced channel fading on the radio links. $H_D$ (radio signal path fading), actual SNIR and actual output power P for the above-mentioned nodes. It is of course important that data can be collected at a rate that allows for a correct representation of the operating condition.

The static network characteristics obtaining block 84 in turn obtains static network characteristics, step 116, and supplies them to the interference determining block 86. The static network characteristics may comprise geographical data, such as each receiver's and transmitter's position, as well as main antenna direction, length and path gain of all signal and interfering paths in the network. The static network characteristics may thus comprise geographical data, path lengths, free space loss of signal paths and interfering paths, antenna characteristics etc. The static characteristics can in many cases be precomputed into more efficient representations.

The interference determining block 86 then estimates the interference on the above-mentioned radio links based on the dynamic observed operating conditions and static network characteristics, step 118. The estimation may be made in a model/hypothesis-based estimator, where the estimator together with collected data and the representation of the static network characteristics constitutes a complete representation of the network.

The collected dynamic operating conditions and the static network characteristics may thus be applied in a model of the wireless network, where the model may be a model based on equations (1) and (2) above. The model may for instance be a model that is based on a relationship between output power of the transmitting nodes and fading on radio links and interfering paths as well as based on a relationship between link quality as detected by the receiving nodes and fading on radio links and interfering paths, where fading on the radio links are radio link characteristics and fading on interfering links represents interference. It is also possible that noise is considered in the relationships. It is additionally possible that interference is represented by one or more parameters of the model. The interference determining block 86 may also continuously update and optimize the model, step 120. The estimation of the interference may be an estimation of the fading in the interfering paths from the fading on the radio links. When the model is based on equations (1) and (2) above, the interference may be obtained through the interference matrix $H_1$.

The estimated interferences have thus been obtained based on the observed dynamic conditions. In this case they may additionally have been obtained based on an application of the observed dynamic operating conditions of each of the at least some links and static network characteristics in a model of the wireless network, where the model is based on a relationship between output power of the transmitting nodes and fading on radio links and interfering paths as well as based on a relationship between link quality as detected by the receiving nodes and fading on radio links and interfering paths.

As an alternative it is possible that the estimated interferences are obtained through the application of machine learning on the observed dynamic operating conditions of each of the at least some links and the static network characteristics.

The estimated interferences and the radio link characteristics, for instance in the form of estimated fading in the interfering paths and determined fading on the radio links, respectively, together form current signal transmission conditions.

The network performance optimizing block 88 then determines, based on the estimated interferences, a combination of individual output powers of the transmitting nodes that optimizes network performance during the current signal transmission conditions.

The network performance may be a combination of radio resource efficiency, power consumption and traffic load. The network performance may therefore be defined by a function of individual link performance parameters, such as a sum or a weighted sum of individual link performance parameters, where the link performance parameters may be a link performance parameter in the group of link quality, link transmission rate and link transmission power.

The network performance may additionally be optimised when the function is maximized with regard to output power during the current signal transmission conditions.

There are various definitions possible for the function, including, but not limited to, 1. squared difference between served rate and demanded rate
2. squared difference between served SNIR and required SNIR
3. a weighted sum of (2) and the link transmit power
4. zero if the served SNIR is above required SNIR and (2) otherwise The determining of the individual output powers may more particularly be carried out through the network performance optimizing block 88 optimizing the network performance with regard to output power and current signal transmission conditions, which current signal conditions comprise the previously mentioned estimated interferences. The optimizing may more particularly be the maximizing of the function with regard to output power for the current signal conditions, step 122.

The maximum output power levels of the transmitting nodes may in this case be obtained through combining the link performance parameter values of the maximized function with the current signal conditions. This may be done through combining the link performance parameter values with the current signal conditions in the above-described system model and obtaining output power values corresponding to the maximum output power levels as a result.

Thereafter the network node updating block 90 updates the maximum output power level values of the above-mentioned transmitting nodes using the maximum power level values that have been obtained based on the maximized function, step 124.

The power limit determination unit thus collects specific data from the network nodes to be able to estimate current influence of interference in the wireless network.

It can thereby be seen that it is possible to have a dynamically set maximum power limitation in the transmitting nodes of the wireless network. This is efficient in limiting interference if the network is congested. The solution requires every node to transmit at as low as possible output power. This will also contribute to substantial energy savings in the network.

As the estimator together with collected data and the representation of the static network characteristics constitutes a complete representation of the wireless network, it is possible to verify the validity of the estimator. The validity of the hypotheses used in the estimator can thus be checked against collected data. For instance, the validity may be verified by checking that there is a match between actual SNIR and estimator predictions.

As the maximum and minimum power settings may be static, they may be set according to a configuration guideline. The maximum and minimum power settings may thus be kept static over the lifetime of network, or possibly updated as a result of planned additions to, or optimizations of the network. That can be considered as one extreme of the operation according to the second embodiment.

As another alternative the maximum and minimum power levels are set differently based on the quality of service of the traffic over the radio link. They may thus be semi-static in that a fixed power level is used for a quality of service.

Another extreme would be that the power limit determination unit calculates a fixed output power (i.e. maximum and minimum set equally), that is continuously updated based on current conditions to maximize the momentary network utility.

An optional Machine Learning layer can modify and optimize the models used in the interference estimator based on convergence performance. Possibly also for prediction of network behaviour.

One more option is to combine this function with Traffic Engineering functionality putting capacity restrictions on traffic transported over certain wireless links.

With knowledge of momentary operating conditions invoking a risk of interference limitation, capacity may be restricted for specifically sensitive paths/hops. This can be done either by applying temporary output power restrictions to specific nodes, or by means of dynamic traffic shaping and QoS handling at some intermediate network node. (In a backhaul network, that functionality could be implemented at positions all the way up to the serving gateway).

The orthogonality of the hypotheses used in the estimator is important for good convergence, and so are the border conditions. An optional step is therefore to have a Machine Learning layer that monitors the convergence performance and modifies the used hypotheses for best convergence.

An additional task of the power limit determination unit could be prioritization in case of conflicts. I.e. balance how interference strikes, based on e.g. the link-based cost of reduced capacity.

The wireless network has mainly been described with reference being made to a wireless point-to-point network. However, it should be realized that the aspects described herein are likewise applicable in a wireless point-to-multipoint network.

Figure 11:
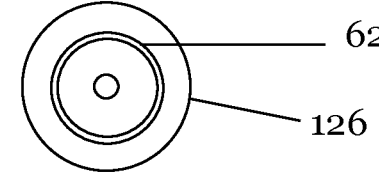
FIG. 11 shows a computer program product comprising a data carrier with computer program code for realizing the control unit.

The computer program instructions used for implementing the control unit may be provided as a computer program that implements the control unit when being run by the corresponding processor. As an alternative, the computer program may be included in a computer program product for instance as computer program code on a data carrier, such as a CD ROM disc or a memory stick. In this case the data carrier carries a computer program with the computer program code, which will implement the above-mentioned control unit. One such data carrier 126 with the computer program code 66 is schematically shown in FIG. 11.

Figure 12:
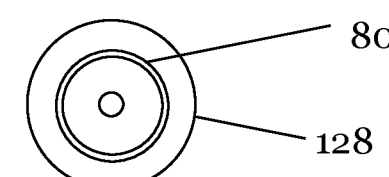
FIG. 12 shows a computer program product comprising a data carrier with computer program code for realizing the power limit determination unit.

The computer program instructions used for implementing the power limit determination unit may likewise be provided as a computer program that implements the power limit determination unit when being run by the corresponding processor. As an alternative, the computer program may be included in a computer program product for instance as computer program code on a data carrier, such as a CD ROM disc or a memory stick. In this case the data carrier carries a computer program with the computer program code, which will implement the above-mentioned method. One such data carrier 128 with the computer program code 8o is schematically shown in FIG. 12.

In the control unit the link quality measure obtaining block may be considered to comprise means for obtaining, from a corresponding receiving node, a momentaneous link quality measure, the requested transmission rate obtaining block may be considered to comprise means for obtaining a momentaneous requested transmission rate, the power requirement determining block may be considered to comprise means for determining a momentaneous power requirement based on the momentaneous link quality measure and the momentaneous requested transmission rate, and the interference limiting block may be seen as comprising means for controlling the radio circuit and where the power requirement investigating element may be seen as comprising means for investigating if a momentaneous output power of the transmitting node satisfies the momentaneous power requirement, and the power control element may be seen as comprising means for controlling the radio circuit to transmit data to the receiving node using the momentaneous output power in case the momentaneous output power of the transmitting node satisfies the momentaneous power requirement and means for adjusting the output power towards the momentaneous power requirement in case the momentaneous output power of the transmitting node does not satisfy the momentaneous power requirement.

The means for controlling the radio circuit may additionally be considered to comprise means for controlling the radio circuit to increase the output power if the momentaneous output power is lower than the momentaneous power requirement and to control the radio circuit to decrease the output power if the momentaneous output power is higher than the momentaneous power requirement.

The means for controlling the radio circuit may additionally be considered to comprise means for controlling the radio circuit to keep the output power below a maximum output power level.

The control unit may furthermore be considered to comprise means for receiving the maximum output power level from the power limit determination unit.

In the power limit determination unit the dynamic operating conditions collecting may be considered to comprise means for collecting dynamic observed operating conditions of at least some links in the wireless network, the static network characteristics obtaining block may be considered to comprise means for obtaining static network characteristics, the interference determining block may be considered to comprise means for estimating the interference of the at least some links based on the dynamic observed operating conditions and static network characteristics, and the network performance optimizing block may be seen as comprising means for determining, based on the estimated interferences, a combination of individual output powers of transmitting nodes that optimize network performance, and the network node updating block may be seen as comprising means for supplying the individual output powers to the transmitting nodes.

The network performance optimizing block may additionally be considered to comprise means for maximizing a function of link performance parameters of the at least some links with regard to output power during current signal transmission conditions.

The means for estimating the interference may additionally be considered to comprise means for applying the dynamic observed operating conditions and static network characteristics in a model of the wireless network.

While aspects of the present disclosure have been described in connection with what is presently considered to be most practical and preferred embodiments, it is to be understood that the disclosure is not to be limited to the disclosed embodiments, but on the contrary, is intended to cover various modifications and equivalent arrangements. Therefore, the disclosure is only to be limited by the following claims.

The invention claimed is:

1. A transmitting node in a wireless point-to-point or point-to-multipoint network, the transmitting node comprising a radio circuit set to transmit data to at least one corresponding receiving node on a corresponding radio link, the transmitting node comprising a processor acting on computer instructions implementing a control unit, wherein the control unit is operative to:

obtain, from a corresponding receiving node, a momentaneous link quality measure, obtain a momentaneous requested transmission rate Rreq, determine a momentaneous power requirement Preq based on the momentaneous link quality measure SNIR and the momentaneous requested transmission rate Rreq, and control the radio circuit to limit interference through:

investigating if a momentaneous output power P of the transmitting node satisfies the momentaneous power requirement Preq, controlling the radio circuit to transmit data to the receiving node using the momentaneous output power P in case the momentaneous output power P of the transmitting node satisfies the momentaneous power requirement Preq, and adjusting the output power P towards the momentaneous power requirement Preq in case the momentaneous output power P of the transmitting node does not satisfy the momentaneous power requirement Preq.

2. The transmitting node of claim 1, wherein the control unit is operative to control the radio circuit to increase the output power P if the momentaneous output power P is lower than the momentaneous power requirement Preq and to control the radio circuit to decrease the output power if the momentaneous output power P is higher than the momentaneous power requirement Preq.

3. The transmitting node claim 1, wherein the control unit is operative to control the radio circuit to keep the output power P below a maximum output power level Pmax.

4. The transmitting node of claim 3, wherein the maximum output power level Pmax is fixed.

5. The transmitting node of claim 3, wherein the maximum output power level Pmax is variable and the control unit is operable to receive the variable maximum output power level Pmax from a power limit determination unit that determines the variable maximum output power level for at least some transmitting nodes in the wireless network.

6. The transmitting node of claim 1, wherein the radio link comprises radio resources, where the radio resources that are available for the radio link are defined using link-related planning factors, where the only link related planning factors used are link-related planning factors taken from the group consisting of hop length, carrier frequency, link attenuation due to free space loss, atmospheric absorption, rain and other wave propagation phenomena, receiver and transmitter antenna gain, detector noise, receiver performance and transmitter performance.

7. A non-transitory computer readable medium storing a computer program for reducing interference in a transmitting node of a wireless point-to-point or point-to-multipoint network, the transmitting node comprising a radio circuit set to transmit data to at least one corresponding receiving node on a corresponding radio link, the computer program comprising computer program code which when run by a processor of the transmitting node, implements a control unit configured to:

obtain, from a corresponding receiving node, a momentaneous link quality measure SNIR, obtain a momentaneous requested transmission rate Rreq, determine a momentaneous power requirement Preq based on the momentaneous link quality measure SNIR and the momentaneous requested transmission rate Rreq, and control the radio circuit to limit interference through:

investigating if a momentaneous output power P of the transmitting node satisfies the momentaneous power requirement Preq, controlling the radio circuit to transmit data to the receiving node using the momentaneous output power P in case the momentaneous output power P of the transmitting node satisfies the momentaneous power requirement Preq, and adjusting the output power P towards the momentaneous power requirement Preq in case the momentaneous output power P of the transmitting node does not satisfy the momentaneous power requirement Preq.

8. A method of reducing interference in a first transmitting node of a wireless point-to-point or point-to-multipoint network, the first transmitting node comprising a radio circuit set to transmit data to at least one corresponding receiving node on a corresponding radio link, the method comprising:

obtaining, from the corresponding receiving node, a momentaneous link quality measure SNIR, obtaining a momentaneous requested transmission rate Rreq, determining a momentaneous power requirement Preq based on the momentaneous link quality measure SNIR and the momentaneous requested transmission rate Rreq, and controlling the radio circuit to limit interference through:

investigating if a momentaneous output power P of the transmitting node satisfies the momentaneous power requirement Preq, controlling the radio circuit to transmit data to the receiving node using the momentaneous output power P if the momentaneous output power P of the transmitting node satisfies the momentaneous power requirement Preq, and adjusting the output power P towards the momentaneous power requirement Preq in case the momentaneous output power P of the transmitting node does not satisfy the momentaneous power requirement Preq.

9. The method of claim 8, wherein the adjusting comprises increasing the output power P if the momentaneous output power is lower than the momentaneous power requirement Preq and decreasing the output power P if the momentaneous output power is higher than the momentaneous power requirement Preq.

10. The method of claim 9, wherein the controlling of the radio circuit comprises controlling the radio circuit to keep the output power P below a maximum output power level Pmax.

11. The method of claim 10, wherein the maximum output power level Pmax is fixed.

12. The method of claim 11, wherein the radio link comprises radio resources, where the radio resources that are available for the radio link are limited by link related planning factors, where the only link related planning factors used are link related planning factors taken from the group consisting of hop length, carrier frequency, link attenuation due to free space loss, atmospheric absorption, rain and other wave propagation phenomena, receiver and transmitter antenna gain receiver performance and transmitter performance.

13. The method of claim 11, wherein the maximum output power level Pmax is variable and set based on dynamic observed operating conditions of at least some links in the wireless network.

14. The method of claim 13, further comprising, in a power limit determination unit, collecting dynamic observed operating conditions of the at least some links in the wireless network, obtaining static network characteristics, estimating the interference of the at least some links based on the dynamic observed operating conditions and static network characteristics, determining, based on the estimated interferences, a combination of individual output powers of transmitting nodes that optimize network performance and supplying the individual output powers to the transmitting nodes, which supplying comprises supplying the first transmitting node with the individual output power that it contributes to the optimizing of network performance as the maximum output power level Pmax.

15. The method of claim 14, wherein estimating the interference of each the at least some links based on the combined dynamic observed operating conditions and static network characteristics comprises applying the dynamic observed operating conditions and static network characteristics in a model of the wireless network, where interference is represented by one or more parameters of the model.

16. The method of claim 14, wherein the network performance is defined by a function of link performance parameters of the at least some links.

17. The method of claim 16, wherein the optimizing of network performance comprises maximizing the function with regard to output power during current signal transmission conditions.

18. A wireless point-to-point or point-to multipoint network comprising a number of transmitting and receiving nodes, where each transmitting node comprises a radio circuit set to transmit data to at least one corresponding receiving node on a corresponding radio link and at least some of the transmitting nodes comprise a processor acting on computer instructions implementing a control unit, wherein the control unit is operative to:

obtain, from a corresponding receiving node, a momentaneous link quality measure SNIR, obtain a momentaneous requested transmission rate Rreq, determine a momentaneous power requirement Preq based on the momentaneous link quality measure SNIR and the momentaneous requested transmission rate Preq, and control the radio circuit to limit interference through:

investigating if a momentaneous output power P of the transmitting node satisfies the momentaneous power requirement Preq, controlling the radio circuit to transmit data to the receiving node using the momentaneous output power P if the momentaneous output power P of the transmitting node satisfies the momentaneous power requirement Preq, and adjusting the output power P towards the momentaneous power requirement Preq in case the momentaneous output power P of the transmitting node does not satisfy the momentaneous power requirement Preq.

19. The wireless network of claim 18, wherein the control unit is operative to control the radio circuit to keep the output power P below a maximum output power level Pmax and the wireless network further comprises a power limit determination unit comprising a processor acting on computer instructions whereby the power limit determination unit is operative to determine the variable maximum output power level Pmax for the at least some transmitting nodes.

\* \* \* \* \*